(12) United States Patent
Wheatley et al.

(10) Patent No.: US 10,775,034 B1
(45) Date of Patent: Sep. 15, 2020

(54) CONNECTORIZED LIGHTING SYSTEM FOR SURFACE APPLIQUES AND METHOD OF RETENTION OF CYLINDRICAL OBJECTS

(71) Applicant: HYPERFORM, INC., Rockledge, FL (US)

(72) Inventors: Harry Daniel Wheatley, Indialantic, FL (US); Joseph Michael Wood, Jr., Melbourne, FL (US); Kurt Wilson, Cocoa Beach, FL (US); Jason Gardner, Melbourne, FL (US)

(73) Assignee: HYPERFORM, INC., Rockledge, FL (US)

( * ) Notice: Subject to any disclaimer, the term of this patent is extended or adjusted under 35 U.S.C. 154(b) by 0 days.

(21) Appl. No.: 16/661,949

(22) Filed: Oct. 23, 2019

Related U.S. Application Data (63) Continuation-in-part of application No. 16/541,119, filed on Aug. 14, 2019.

(60) Provisional application No. 62/718,953, filed on Aug. 14, 2018, provisional application No. 62/749,324, filed on Oct. 23, 2018.

(51) Int. Cl.
| | |
|---|---|
| *F21V 23/06* | (2006.01) |
| *F21V 8/00* | (2006.01) |
| *F21V 9/30* | (2018.01) |
| *F21Y 115/10* | (2016.01) |

(52) U.S. Cl.
CPC .............. *F21V 23/06* (2013.01); *F21V 9/30* (2018.02); *G02B 6/0006* (2013.01); *F21Y 2115/10* (2016.08)

(58) Field of Classification Search
CPC ......... F21V 23/06; F21V 9/30; G02B 6/0006; F21Y 2115/10
See application file for complete search history.

(56) References Cited

U.S. PATENT DOCUMENTS

| | | | | |
|---|---|---|---|---|
| 5,999,834 | A * | 12/1999 | Wang | A61B 5/14552 600/310 |
| 9,647,349 | B1 * | 5/2017 | Stillman | H01R 13/5216 |
| 2004/0252501 | A1 * | 12/2004 | Moriyama | F21V 19/0025 362/238 |
| 2005/0030765 | A1 * | 2/2005 | Southard | G09F 13/0413 362/559 |
| 2005/0207151 | A1 * | 9/2005 | Aanegola | F21V 21/002 362/227 |

(Continued)

*Primary Examiner* — Donald L Raleigh
(74) *Attorney, Agent, or Firm* — Stephen C. Thomas (57) ABSTRACT

A connectorized lighting system for a base structure such as a deck pad, comprising a base structure having an a retaining cavity disposed in and running along a surface of the base structure, a lighting element inserted into the retaining cavity, and connectorized light source that provides electrical power to the lighting element, exhibits a low profile, and may be removable and replaceable without tools. The base structure may be a deck pad on a boat or a covering for a floor, spa, spa cabinet, pool, or any other surface. The deck may comprise EVA or PE foam material, and may comprise one or more layers of sheet material. The retaining cavity may comprise a window and bevels for visibility. A lighting element may be held in place by forces created when the compressible material of the base structure is compressed by pressing the lighting element into the retaining cavity.

21 Claims, 6 Drawing Sheets

(56) References Cited

U.S. PATENT DOCUMENTS

| | | | |
|---|---|---|---|
| 2007/0025103 A1* | 2/2007 | Chan | F21V 19/0025 |
| | | | 362/235 |
| 2007/0285920 A1* | 12/2007 | Seabrook | F21V 29/713 |
| | | | 362/240 |
| 2008/0205055 A1* | 8/2008 | Schug | F21V 29/76 |
| | | | 362/246 |
| 2009/0207617 A1* | 8/2009 | Merchant | F21V 17/16 |
| | | | 362/294 |
| 2013/0201673 A1* | 8/2013 | Chien | F21V 17/16 |
| | | | 362/217.13 |
| 2014/0369655 A1* | 12/2014 | Dietrich | G02B 6/4256 |
| | | | 385/92 |
| 2017/0184283 A1* | 6/2017 | Chien | F21V 21/005 |
| 2018/0172942 A1* | 6/2018 | Bauco | G02B 6/0006 |
| 2018/0255759 A1* | 9/2018 | Van Kleef | A01M 29/10 |

* cited by examiner

CONNECTORIZED LIGHTING SYSTEM FOR SURFACE APPLIQUES AND METHOD OF RETENTION OF CYLINDRICAL OBJECTS

CROSS REFERENCE TO RELATED APPLICATIONS AND INCORPORATION BY REFERENCE

This non-provisional patent application is a non-provisional of U.S. patent application Ser. No. 62/749,324 filed in the United States Patent and Trademark Office (USPTO) on Oct. 23, 2018 entitled CONNECTORIZED LIGHTING SYSTEM FOR SURFACE APPLIQUES AND METHOD OF RETENTION OF CYLINDRICAL OBJECTS, which is hereby incorporated by reference in its entirety; and this patent application is a continuation-in-part (CIP) of U.S. non-provisional patent application Ser. No. 16/541,119 filed in the United States Patent and Trademark Office (USPTO) on Aug. 14, 2019 entitled LIGHTING SYSTEM FOR SURFACE APPLIQUES AND METHOD OF RETENTION OF CYLINDRICAL OBJECTS, which is hereby incorporated by reference in its entirety, which was a non-provisional of U.S. patent application Ser. No. 62/718,953, filed in the United States Patent and Trademark Office (USPTO) on Aug. 14, 2018 entitled LIGHTING SYSTEM FOR SURFACE APPLIQUES AND METHOD OF RETENTION OF CYLINDRICAL OBJECTS, which is hereby incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for providing connectorized lighting systems and devices for appliques that are applied to all types of surfaces, such as surfaces of marine products including but not limited to boats, jet skis, watercraft, paddleboards, and the like; adventure vehicles such as three and four wheel vehicles used for on-road or off-road purposes; golf carts; recreational vehicles; campers; hunting blinds; vehicles of all kinds; spa surfaces and spa cabinet surfaces; swim spas; pool surfaces and pool decks; and any other surface, structure, product or system for which such surface coverings may be desired such as for instance coolers, for decorative, cushioning, sound deadening or other purposes; and the application relates further to structures for retaining cylindrically-shaped objects in a base structure or pad. In an embodiment, the light source of the invention comprises a detachable electric connector for connecting and disconnecting an electrical conductor or plurality of conductors such as might be used to provide electrical or other power to the light source. In an embodiment, the light source of the invention comprises a detachable optical connector for connecting and disconnecting an optical light emitting or light transmitting element.

2. Background Art

Traction and cushioning pads, are often referred to generally as "pads" or "traction pads", for boats, vehicles, sports equipment, and other structures such as, for example, boats, jet skis, kayaks, golf carts, recreational vehicles, pool decks, spas, sporting goods, hunting blinds and other structures which may be used to provide traction, to provide a soft surface upon which to stand or sit, to provide sound deadening and to provide decoration to the surfaces to which they are applied. In certain cases, but not always, such pads are configured as appliques that are attached to a surface of the vehicle or structure by using snaps or by chemical bonding to the surface to which they are applied. In many cases the pad material is a compressible material such as EVA or PE foam or rubber.

Many of the vehicles or structures to which such pads are applied are used or operated at night. Such vehicles or structures may utilize lighting to illuminate the surfaces to which the pads are applied, but such lighting is typically located such that it may cause visibility issues at night by reducing the night vision of a user. It would be advantageous for lighting to be integrated in the pads so as to provide increased visibility, and decoration, to the pads and to the surrounding surfaces, without causing night blindness in the user.

What is needed in the art, therefore, is an apparatus and/or method adapted to integrate lighting into traction, sound deadening, acoustic sound absorbing or cushioning pads or base structures that may be placed, for example on boats; watercraft; jet skis spa surfaces and spa cabinet surfaces; swim spas; pool surfaces and pool decks; equipment; vehicles; recreational vehicles; towable campers; golf carts; coolers; floors; interior or exterior walls; displays; or any other vehicle, structure, or equipment surfaces. Since many lighting elements, such as strip lighting elements, are packaged in a cylindrically shaped housing or container, a system and method for capturing such cylindrically shaped strip lights in a traction or cushioning pad applique, which allows for the easy and quick installation of the lighting element into the traction or cushioning pad applique, is needed. Furthermore, as some of these lighting systems require electric power to operate, a system, device and method for attaching and retaining optical sources such light emitting diodes (LEDs), lasers and the like in the surface covering material, while keeping a low overall profile commensurate with the use of the surface covering, is needed.

BRIEF SUMMARY OF THE INVENTION

The present invention comprises an apparatus and method that have one or more of the following features and/or steps, which alone or in any combination may comprise patentable subject matter.

The present invention overcomes the shortcomings of the prior art in that it integrates lighting elements directly in traction and cushioning pad appliques, providing both increased visibility for the user and decoration of the surface to which they are applied. Lighting elements may be assembled into a traction or cushioning pad applique by pressing a lighting element or elements into a receiving recess that is adapted to receive and retain the lighting element. In a preferred embodiment, the lighting element is retained by a complementary-shaped opening in the pad. In alternative embodiments, the lighting element may be retained by capturing the lighting element in a press fit in the pad, in which the lighting element is held in place by the compression of pad material around the lighting element, creating forces acting on the lighting element as the lighting element is pressed into and compress the pad material.

The lighting system and method of retention of cylindrical objects of the invention may be applied to, attached to, or form a part of any boat, kayak, canoe, water sports vehicle, jet ski, pool, spa, equipment, vehicle, recreational vehicle, towable camper, golf cart, cooler, floor, wall, display, or other vehicle, structure or equipment surface. The invention is intended for use on any surface, on any structure. The light system and method of retention of cylindrical objects of the invention may be used to capture and retain lighting elements of any cross sectional shape, although in certain embodiments the cross section of the light-retaining feature of the invention may be depicted in the figures as capturing lighting elements or other objects to be retained of cylindrical or rectangular cross section in the present written description and drawings.

In an embodiment, the light source of the invention comprises a detachable electric connector for connecting and disconnecting an electrical conductor or plurality of conductors to the light source for providing power to the light source. In an embodiment, the light source of the invention comprises a detachable optical connector for connecting and disconnecting a lighting element to the light source. The light source and, in embodiments, connectors may be captured in a housing that is held in place in a pad or base structure of the invention by compressing the pad material between two surfaces of the light source housing, creating a compression fit by the opposing forces created by the pad seeking to expand against opposing surfaces of the housing. In this exemplary embodiment, the light source may be disconnected from an electric cable, or an optical cable, or both, so that it may easily be replaced without the need to strip and connect electrical wiring (such as by soldering or crimping connectors onto the wiring). Thus, replacement of the light source in an installed pad is greatly simplified.

In accordance with one embodiment of the present invention, the invention comprises the embedding of lighting elements directly into the traction and cushioning pads in such a manner that light emanates from the pad itself, without the need for any lighting exterior to the pad.

In an embodiment, the invention comprises a retention apparatus for retaining an object, comprising a base structure that has a surface and a retaining cavity disposed in and running along and below the base structure surface, the retaining cavity comprising an opening into the surface that runs along the retaining cavity for allowing the insertion of an object to be retained in said retaining cavity. In embodiments, the object to be retained may be a lighting element. In cross section, the retaining cavity opening is further defined as having a pair of opposing bevel surfaces where the retaining cavity opening opens into the base structure surface. The retaining cavity opening further comprises a pair of opposing window retention surfaces disposed between the retaining cavity and the pair of opposing bevel surfaces.

In embodiments, the base structure may be fabricated from a sheet or a plurality of sheets of compressible material such as, by way of example and not limitation, EVA or PE foam.

In embodiments, a distinct advantage of the present invention over the prior art is that the present invention provides a low profile means for capturing and retaining a light source or power source for providing optical power to lighting elements that are captured within compressible base structures while providing a minimum protrusion of the light source or power source housing beyond the surfaces of the base structure. This means, for example, that when a connectorized lighting system of the invention is used on a base structure comprising a floor surface covering on a vehicle such as a boat, the user may tread on the light source or power source housing without fear of foot injury or tripping over the light source. The light source or power source housing of the invention provides safer and more comfortable use of the base structure over the prior art in any application because it does not protrude beyond the surfaces of the base structure by any great in extent. In a non-limiting, exemplary embodiment, the protrusion of the light source or power source housing of the invention beyond any surface of a base structure in which it is retained may be no greater than 0.050-0.100 inches. In other embodiments, for any application or use, such protrusion may be more or less than 0.050-0.100 inches.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DESCRIPTION OF THE INVENTION

The following provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

As used herein, "base structure" 100 includes within its meaning a physical structure, which may be, but is not necessarily planar, and that may comprise one or a plurality of layers of material, wherein each sheet of material comprising the base structure may be of the same material composition or differing material composition. "Pad", "traction pad" and "surface covering" are each non-limiting examples of a base structure. The material comprising the base structure may exhibit a desired durometer, surface friction, surface cushion, surface texture, appearance, sound absorbing characteristic, or a combination of such characteristics, such that the base structure provides a desired cushioning, traction, appearance, friction, sound absorbing, appearance or other desired characteristic when applied to a subject surface. The subject surface to which the base structure is applied may be any surface such as, by way of example and not limitation, a boat, vehicle, kayak, recreational vehicle, camper, golf cart, wall, floor, pool or spa surface, pool or spa deck, spa cabinet, cooler, or any other surface. The base structure may be attached to the subject surface by any means including chemical bonding, gravity, snaps or retentive features in the a base structure material that are adapted to retain or capture the traction pad when used adjacent to other traction pads. Such features may include, for example, a friction fit between adjoining base structures or complementary retaining features in adjoining base structures. Traction pads or base structures may comprise any material that achieves the desired cushioning, traction, appearance or sound absorbing characteristics, for example and not by way of limitation, Ethylene-Vinyl Acetate (EVA) foam, Polyethylene (PE) foam, combinations of EVA and PE, rubber, plastics or any other material or combination of materials. Typically, but not necessarily, such materials are provided as stock in sheet form. A base structure of the invention may comprise one or a plurality of layers of traction pad sheet material that have been attached, forming layers. The layers of sheet material comprising a base structure of the invention may be attached by chemical bonding, heat lamination or any other means known in the art for attaching sheets of material together.

In the figures, like numbered item callouts refer to like features.

As used herein, "object(s) to be retained", item 104, includes within its meaning any object desired to be retained in the base structure of the invention 100, and may include lighting elements, glow-in-the-dark elements, or any other desired element or structure to be retained, whether or not such object to be retained emits light. The object to be retained may be of any cross sectional shape. The object to be retained may comprise EVA or PE foam.

As used herein, "lighting element" includes within its meaning any element or structure, whether or not powered by electricity, that emits light, and may include strips of electrical light elements such as Light Emitting Diodes (LEDs), lasers, incandescent lighting, and other electrically powered lighting. "Lighting element" also includes within its meaning glow-in-the-dark lighting elements and structures that utilize bioluminescence, chemiluminescence, phosphorescence, and radioluminescence to emit light. "Lighting element" also includes within its meaning structures that comprise optical fibers or conductors having a first end into which light energy is launched from a light source and wherein the launched light energy travels along the fiber and is partially internally reflected allowing a portion of the light energy launched into the fiber to escape the fiber along its length, causing the optical fiber to appear as glowing. Any light source may be used to launch light energy into such optical fibers including, but not limited to, LEDs, lasers, laser diodes, incandescent light, and naturally occurring light. The lighting elements of the invention may emit light of any color or intensity, and may be controllable through the use of a controllable power source in communication with a light source, or lighting element, for controlling the amount of power supplied to the light source or light element, or color of the light element, and thereby allowing control of the amount, or color, or both, of light energy emitted by the lighting element. The controllable power source may be in communication with a controller, which may, for example comprise a switch array or software application executing non-transitory computer executable instruction on a computing device, such as a computer or cell phone, allowing a user to thusly control the color or intensity, or both, of the light emitted by the lighting element. Such control may be utilized, for example, to command a steady light of unchanging intensity, or color, or both. Alternatively, such control may be utilized to command time-varying changes in light intensity or color, or both, in either random or repetitive patterns. As a non-limiting example the invention may be utilized to create specific moods such as when a lighted traction pad, or plurality of traction pads, are attached to a surface or a plurality of surfaces of a boat such as floor surfaces, gunwales, console surfaces, or other surfaces when the boat is operated at night.

As used herein, "compressible" includes within its meaning, as a non-limiting range, a Shore hardness range of between 10 and 100 on the Shore 00 scale and any range within this range.

Referring now generally to FIGS. 1 through 10, various embodiments of the invention are depicted. In embodiments, the invention may comprise a retention apparatus 105 for retaining an object to be retained 104, which may be of any cross sectional shape and may be, for example, a lighting element, disposed in a base structure 100; an apparatus and method for capturing lighting or other elements in a traction pad; or the resulting traction pad with the included captured elements. In an embodiment, the invention comprises features that allow the incorporation of lighting elements into a traction pad or other base structure, and the embodiments shown are exemplary only. The base structure may be, but is not necessarily, planar. In the figures certain non-limiting embodiments are depicted in which the base structure 100 may be a planar structure such as a traction pad, and surface A may be the traction surface of a typical traction pad which may be comprised of at least one layer of EVA foam, PE foam or other material. Again this is but a non-limiting example of a base structure. In a typical embodiment traction pad 100 may comprise a plurality of layers of sheet material, resulting in a total traction pad thickness of T. It is not necessary that the material comprising each layer of a multi-layer base structure be comprised of similar materials. Base structure 100 may be attached to a surface 101 which may be a surface of, for example, a boat deck, a recreational vehicle, a kayak, a pool or spa deck, a golf cart, or any other surface upon which it is desired to apply the base structure. In embodiments, the invention may comprise a housing 300 comprising a light source that is in optical communication with a lighting element in the non-limiting case in which the object to be retained 104 is a lighting element. Retention apparatus 105 and the object to be retained 104 may take be used to create any pattern, logo, lettering or other decorative patterns in an upper surface A of the base structure 100 as may be desired by a user.

Figure 1:
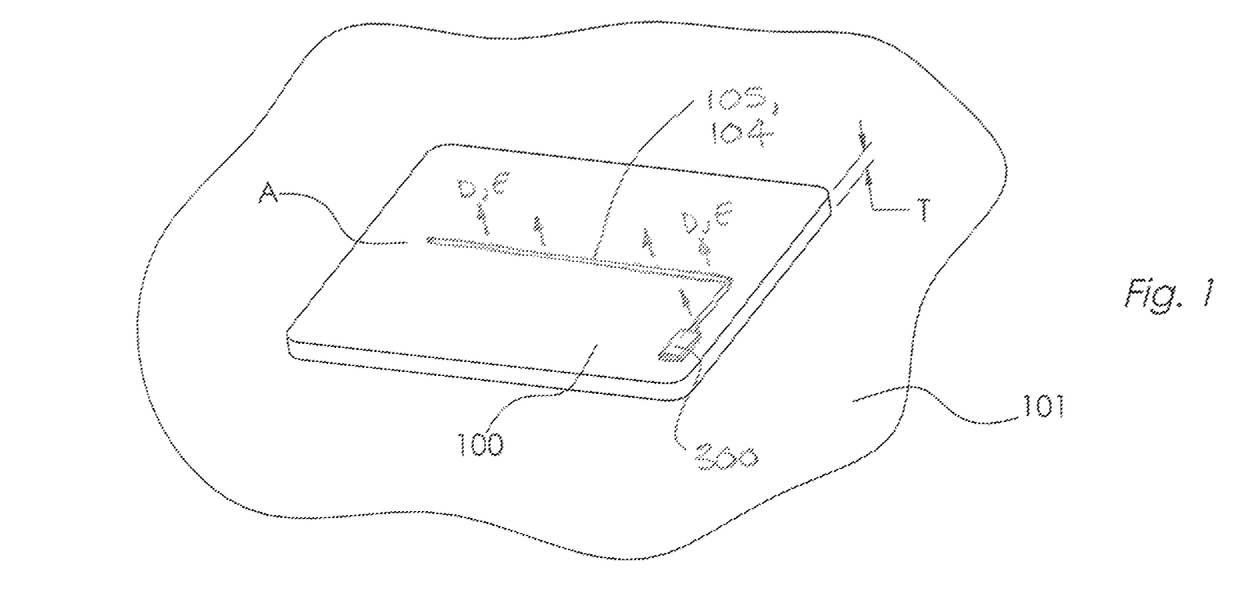
FIG. 1 depicts a perspective view an embodiment of a base structure of the invention, showing a light source housing and object to be retained in an upper surface of an installed pad or base structure of the invention. The object to be retained may be a lighting element which may take any decorative shape or form any desired patter in the upper surface of the base structure.

Referring now to FIG. 1, an exemplary base structure 100 is attached to a surface 101 as herein before described. The method of attachment of traction pad 100 onto surface 101 may be any method of attachment, including but not limited to the use of chemical adhesives, gravity or snaps. In the exemplary embodiment of FIG. 1, base structure 100 may provide a decorative, sound deadening or cushioning effect to surface 101 upon which it is attached, and it may be of any arbitrary shape or outline. The shape and outline of traction pad 100 as depicted in FIG. 1 is merely exemplary. Surface A is shown for reference and may be, for example, an upper surface of a traction pad in an exemplary case in which base structure 100 is a traction pad. While base structure 100 is depicted as a planar shape in FIG. 1 having a thickness T, it is not necessary that this be the case. In general, base structure 100 may take on any planar or non-planar shape. In embodiments, the invention may comprise a housing 300 comprising a light source that is in optical communication with a lighting element in the non-limiting case in which the object to be retained 104 is a lighting element. Retention apparatus 105 and the object to be retained 104 may take be used to create any pattern, logo, lettering or other decorative patterns in an upper surface A of the base structure 100 as may be desired by a user.

Figure 2:
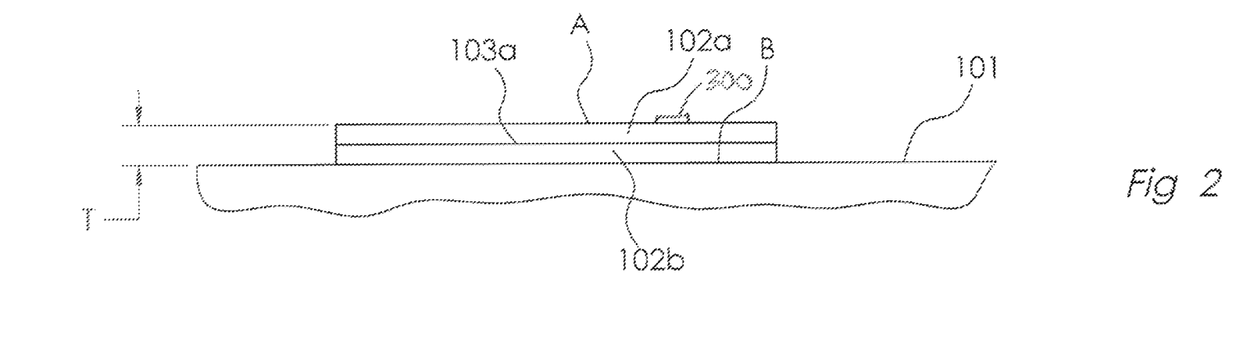
FIG. 2 depicts a side view of an embodiment of a traction pad of the invention, showing a plurality of layers of pad material, wherein the traction pad is mounted onto a surface such as a boat, pool, spa, cooler, golf cart, interior or exterior wall, kayak, recreational vehicle or any other surface.

Referring now to FIG. 2, an exemplary base structure 100 comprising two layers of sheet material such as a compressible material including but not limited to EVA or PE foam, or rubber, or any compressible material, is depicted as attached to surface 101. Surface A may be an upper surface of the base structure which is the surface upon which, for example, a boater may stand in the cases in which the base structure is mounted onto the deck of a boat to function as a traction pad. Surface A may, in an embodiment, provide a decorative, cushioning or non-slip surface to the boat user. The base structure 100 may, in the non-limiting exemplary planar case shown, be of total thickness T and, in this exemplary embodiment, is comprised of sheet material layer 102a and sheet material layer 102b which have been attached at boundary 103a by any means known in the art such as chemical adhesives, ultrasonic, eutectic, or attachment methods using heat to bond sheets 102a and 102b at boundary junction 103a which may include, but not be limited to flame lamination or other known methods of applying heat. Surface B of base structure 100 which may be, but is not necessarily, a surface on which the base structure 100 is attached to surface 101. Light source housing 300, which may be located at any location on base structure as desired by a user, is shown for reference.

Figures 3, 4, 5:
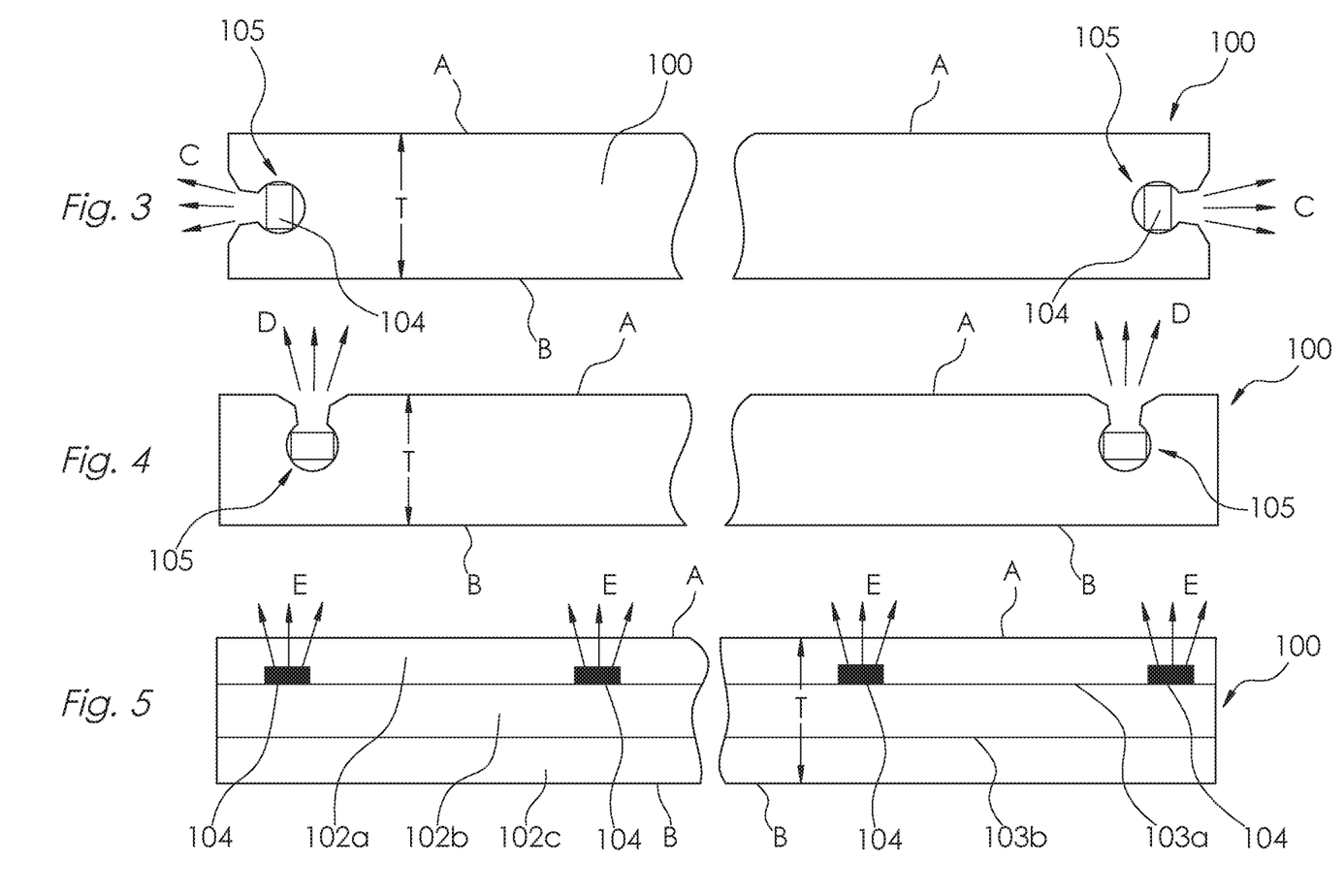
FIG. 3 depicts a side view of an embodiment of a base structure of the invention showing the retention apparatus of the invention disposed in a side wall of an exemplary planar base structure, and showing objects to be retained, such as lighting elements, disposed in and retained by the retention apparatus.
FIG. 4 depicts a side view of an embodiment of a base structure of the invention showing the retention apparatus of the invention disposed in a top wall of an exemplary planar base structure, and showing objects to be retained, such as lighting elements, disposed in and retained by the retention apparatus.
FIG. 5 depicts a side view of an embodiment of a base structure of the invention, showing objects to be retained, such as lighting elements, disposed between material of layers of the base structure.
Figure 8:
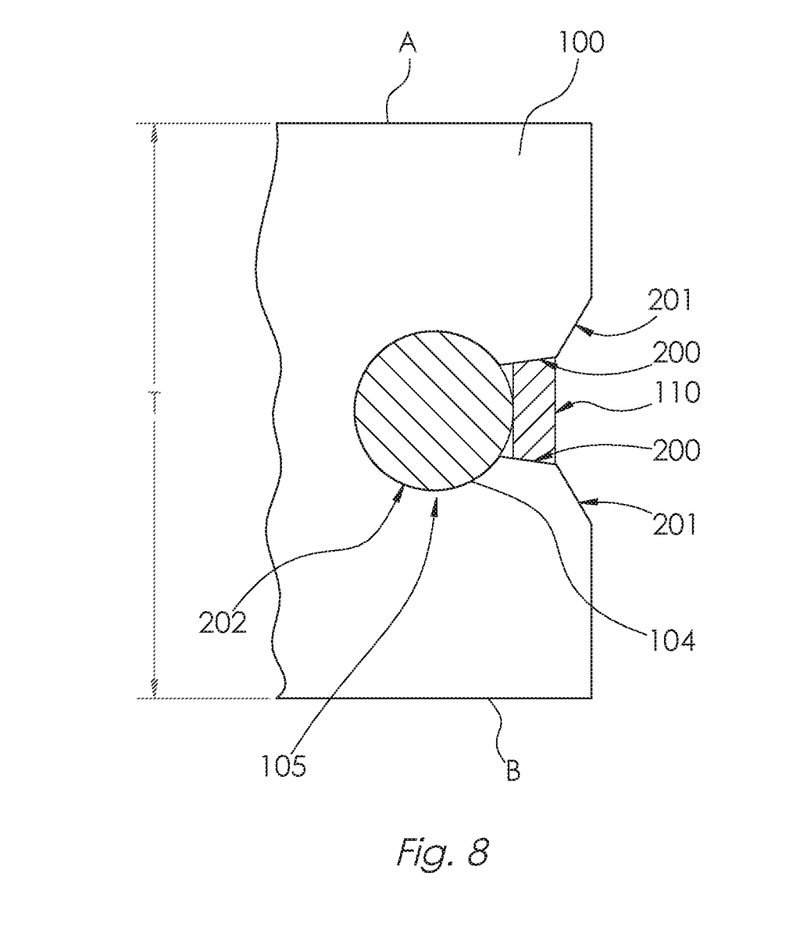
FIG. 8 depicts a side cross section view of an embodiment of the inventive retention apparatus of the invention, in which the retention feature is located in a side surface of a base structure.

Referring now to FIG. 3, an embodiment of the invention is shown in which the objects to be retained 104 are captured and retained within a retention apparatus 105 which is shown in further detail in FIG. 8 In an exemplary non-limiting embodiment in which the object to be retained 104 is a lighting element and the base structure has a thickness T, light rays C may emanate from the sides of base structure 100, causing illumination, for example in the form of a soft glow effect, around exterior surfaces or sides of the base structure 100. In an embodiment, lighting elements 104 may be inserted into the light retaining features of the light retaining groove where they may be held there by forces provided by the compression of the compressible base structure material comprising base structure 100, such as EVA or PE foam, or rubber, acting on lighting element 104 to retain it in place. Surfaces A and B are shown for reference.

Likewise, FIG. 4 depicts an exemplary, non-limiting embodiment of the invention in which retention apparatus 105 is disposed in an upper surface, surface A, of base structure 100 of thickness T, allowing light D to emanate upward from surface A of base structure 100. In this exemplary embodiment, lighting elements 104 may provide a lighted outline of the base structure 100. However, this is simply an exemplary use, and any pattern of lighting may be routed or otherwise formed in surface A of traction pad 100 to form any pattern desired, including but not limited to decorative patterns, logos, images or lettering. Also depicted is surface B of base structure 100 which may be, but is not necessarily, a surface on which base structure 100 is attached to surface 101 as shown in FIGS. 1 and 2. Such attachment between surface B and surface 101 may be accomplished by any means know in the art such as, for example, chemical adhesives, snap fixtures, being held in place by gravity, or any other means.

Referring now to FIG. 5, an alternate embodiment of the invention is depicted in which the object to retained 104 is one more lighting elements 104 that are captured between layers in a multi-layer base structure 100, without the use of the retention apparatus 105, and in which base structure 100 has a thickness T. In the specific example shown in FIG. 5, an exemplary three layer (comprising layers 102a, 102b, 102c, having boundary junctions 103a and 103b) base structure is depicted; however, it is understood that the scope of the invention includes one or any number of layers of planar sheet material. It is not necessary that each layer of base structure 100 be of similar thickness or material. In the embodiment depicted in FIG. 5, lighting elements 104 are captured and retained between layer 102a and layer 102b in boundary junction 103a, allowing light E to radiate through layer 102a, causing a soft glow to be created anywhere the lighting elements 104 are located on the base structure 100. Lighting elements 104 may be bonded to a surface of one or both of layer 102a and layer 102b. The scope of the invention includes any number, formation, shape or outline of lighting elements 104 such that any desired lighted pattern can be created in base structure 100. Surface B is shown for reference and is typically the surface upon which base structure 100 may be attached to surface 101 as depicted in FIGS. 1 and 2.

Retention apparatus 105 may be located in any surface, and in more than one surface, of base structure 100. Thus, in an exemplary embodiment, retention apparatus 105 may be disposed in more than one surface of base structure 100, enabling retention apparatus 105 to wrap around base structure 100, and to retain any object desired to be retained 104, in any pattern. Further, in embodiments, base structure 100 may comprise more than one retention apparatus 105, on one or a plurality of base structure surfaces, in any pattern.

Figure 6:
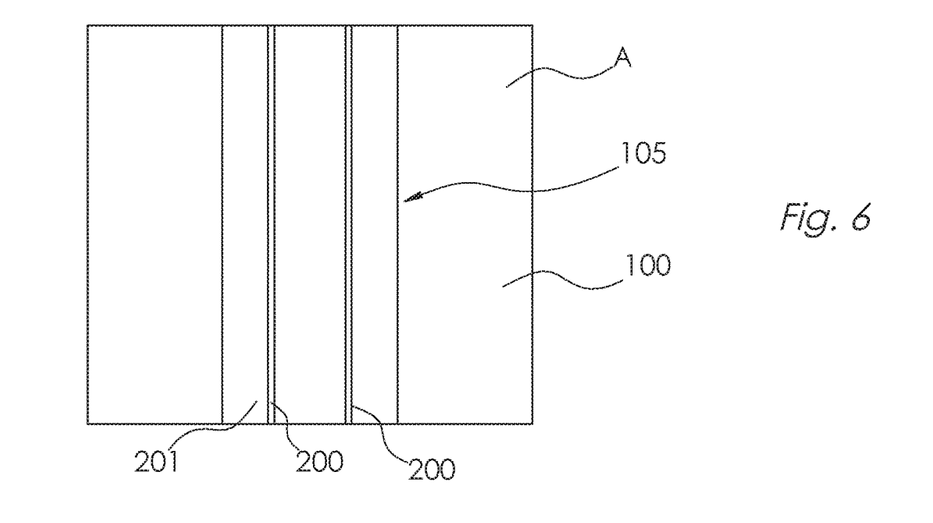
FIG. 6 depicts a top view of an embodiment of the inventive retention apparatus of the invention, in which the retention apparatus is located in a top surface of a base structure.
Figure 7:
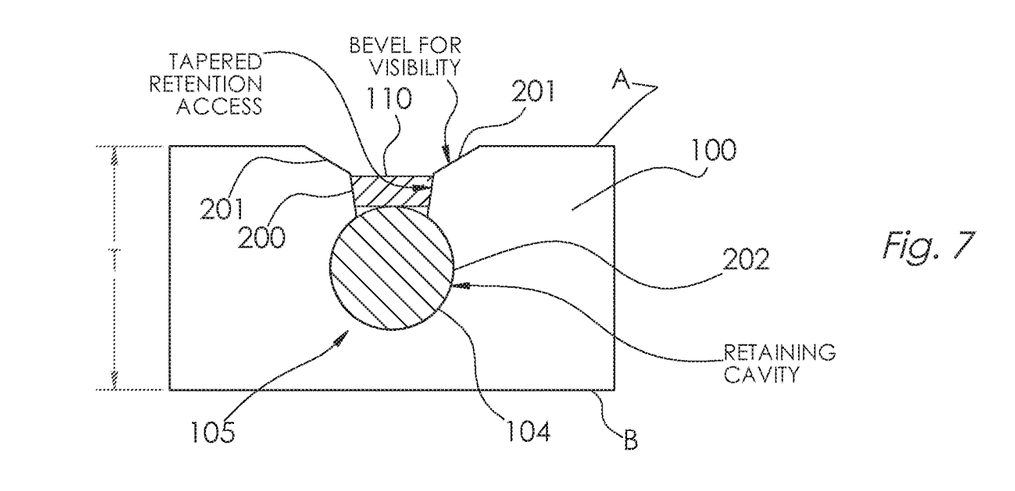
FIG. 7 depicts a side cross section view of an embodiment of the inventive retention apparatus of the invention, in which the retention apparatus is located is a top surface of a base structure.

Referring now to FIGS. 6 and 7, an upper view and cross-section view of the retaining apparatus of an embodiment of the invention, respectively, are depicted in which the retaining apparatus is disposed in a top surface of a base structure 100. The retaining apparatus may comprise opposing bevels 201, opposing tapered window retention surfaces 200, and retaining cavity 202, which features collectively comprise a retaining apparatus for retaining an object to be retained 104 (as depicted in other figures) in retaining cavity 202. These features may be routed into base structure 100. While retaining cavity 202 is shown to be circular in cross sectional shape in the example of FIG. 7, any cross sectional shape such as rectangular, triangular, dovetail, circular or any other cross sectional shape, which is not necessarily symmetrical in shape, may comprise retaining cavity 202. Base structure 100 is characterized as having a surface which may be any surface of base structure 100. Retaining cavity 202 may be disposed in and running along and below the surface (in the example of FIG. 7, the surface is surface A, but generally, the surface may be any surface of base structure 100). The retaining cavity 202 has an opening into the surface of base structure 100 (in the example of FIG. 7, surface A) between opposing tapered window retaining surfaces 200, through which the object to be retained must pass in order to be inserted into retaining cavity 202. In FIGS. 7 and 8 it can been seen that, in embodiments, optional window 110 may occupy and occlude this opening. The opening between opposing tapered window retaining surfaces 200 runs along the retaining cavity for allowing the insertion of an object to be retained 104 in retaining cavity 202. The retaining cavity opening is further defined as comprising a pair of opposing bevel surfaces 201 where the retaining cavity opening opens into the base structure surface (surface A in the non-limiting example of FIGS. 7 and 8). The retaining cavity opening has a pair of opposing window retention surfaces 200 disposed between the retaining cavity 202 and the pair of opposing bevel surfaces 201. In embodiments, the cross sectional shape of retaining cavity 202 may be complementary to the object to be retained 104. In embodiments, the object to be retained 104 may be larger in a cross sectional dimension such that when the object to be retained 104 is placed into retaining cavity 202, the material comprising traction pad 100 is compressed, creating forces tending to retain the object to be retained 104 in retaining cavity 202. The object to be retained 104 may be inserted into the retaining cavity 202 where it is held in place, typically, by the compression of base structure 100 material around the object to be retained 104, which base structure 100 material is, in embodiments but is not necessarily, compressible and may be, but is not necessarily, EVA or PE foam. In the embodiment depicted in FIGS. 6 and 7, the object to be retained 104 is shown in exemplary fashion as lighting element 104, which is held in place by retention forces created by the compression of the base structure material resulting in normal forces on object to be retained 104, holding it in place. In alternate embodiments, optional window 110 which may be a translucent or transparent material, such as lexan or any clear, semi-opaque, translucent or other material, such as a plastic material, may be captured between the opposing surfaces of tapered window retention surfaces 200, and may be held in place by compressive forces in the base structure 100 material exerting forces optional window 110, causing it to be held in place as depicted. In alternate embodiments, item 110 need not be clear or translucent, nor made of plastic necessarily. In this way, retaining cavity 202 may be sealed by optional window 110 to prevent the entrance of dirt, solvents, humid air or other gases, water or other contaminants into retaining cavity 202.

Figure 9:
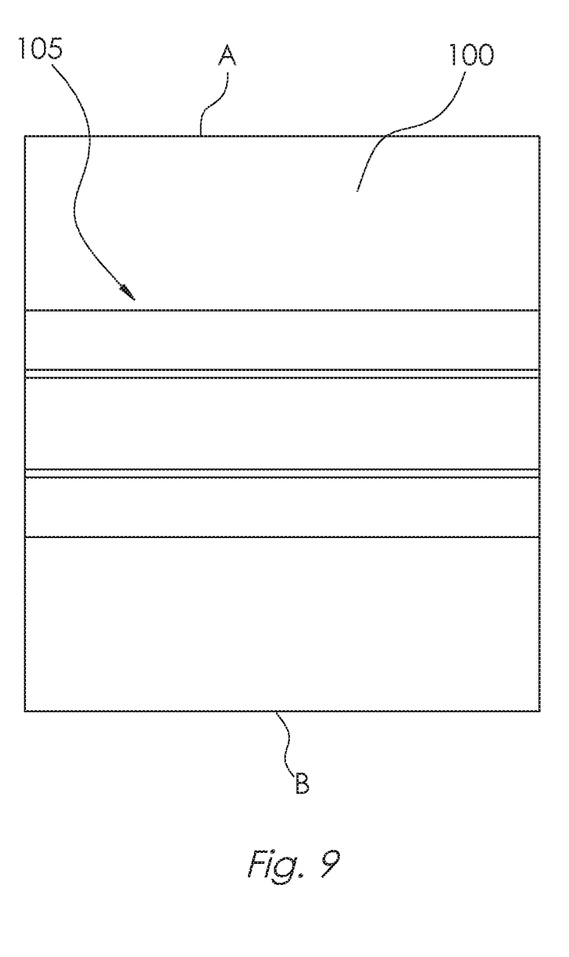
FIG. 9 depicts a side view of an embodiment of the inventive retention apparatus of the invention, in which the retention apparatus is located in a side of a base structure.

Referring now to FIGS. 8 and 9, a side view and cross-section view of the light retaining apparatus of an embodiment of the invention is depicted in which the object retaining apparatus is disposed along a side of a base structure 100 such as a traction pad. The retaining apparatus comprises opposing bevels for visibility 201, opposing tapered window retention surfaces 200, and retaining cavity 202 which features retaining apparatus 105 for retaining an object to be retained 104 in retaining cavity 202. These features may be routed into base structure 100. While retaining cavity 202 is shown to be generally circular in shape, any shape such as rectangular, triangular or any other shape in cross-section may comprise retaining cavity 202. The object to be retained 104, which may be but is not necessarily a lighting element in any embodiment, is inserted into retaining cavity 202 where it is held in place, typically, by the compression of the base structure 100 material, which may be but is not necessarily compressible material such as EVA or PE foam. In the embodiment depicted in FIGS. 8 and 9, the object to be retained 104 is lighting element 104, which is held in place by retention forces created by the compression of the base structure 100 material exerting normal forces on element 104, causing it to be retained in place. In alternate embodiments, optional window 110 which may be any transparent, semi-opaque, translucent or other material, such as a plastic or lexan material or any polycarbonate, may be captured between the opposing surfaces of tapered window retention surfaces 200, and held in place there by compressive forces in the base structure 100 material acting on optional window 110 and thereby holding it in place. In alternate embodiments, item 110 need not be clear or translucent, nor made of plastic necessarily. Item 110 may be fabricated from any material. In this way, retaining cavity 202 may be sealed to prevent the entrance of dirt, humid air, water or other contaminants. The selection of material comprising optional window 110 may be made based upon the desired amount of light transmission there through, a desired color to be achieved when viewing the light transmitted through window 110. The material comprising optional window 110 may be selected for chemical, fluid, temperature or other environmental compatibility for cases in which the invention may be used in environments in which the window may come into contact with specific chemicals or materials, or any other considerations specific to a particular use.

Figure 10:
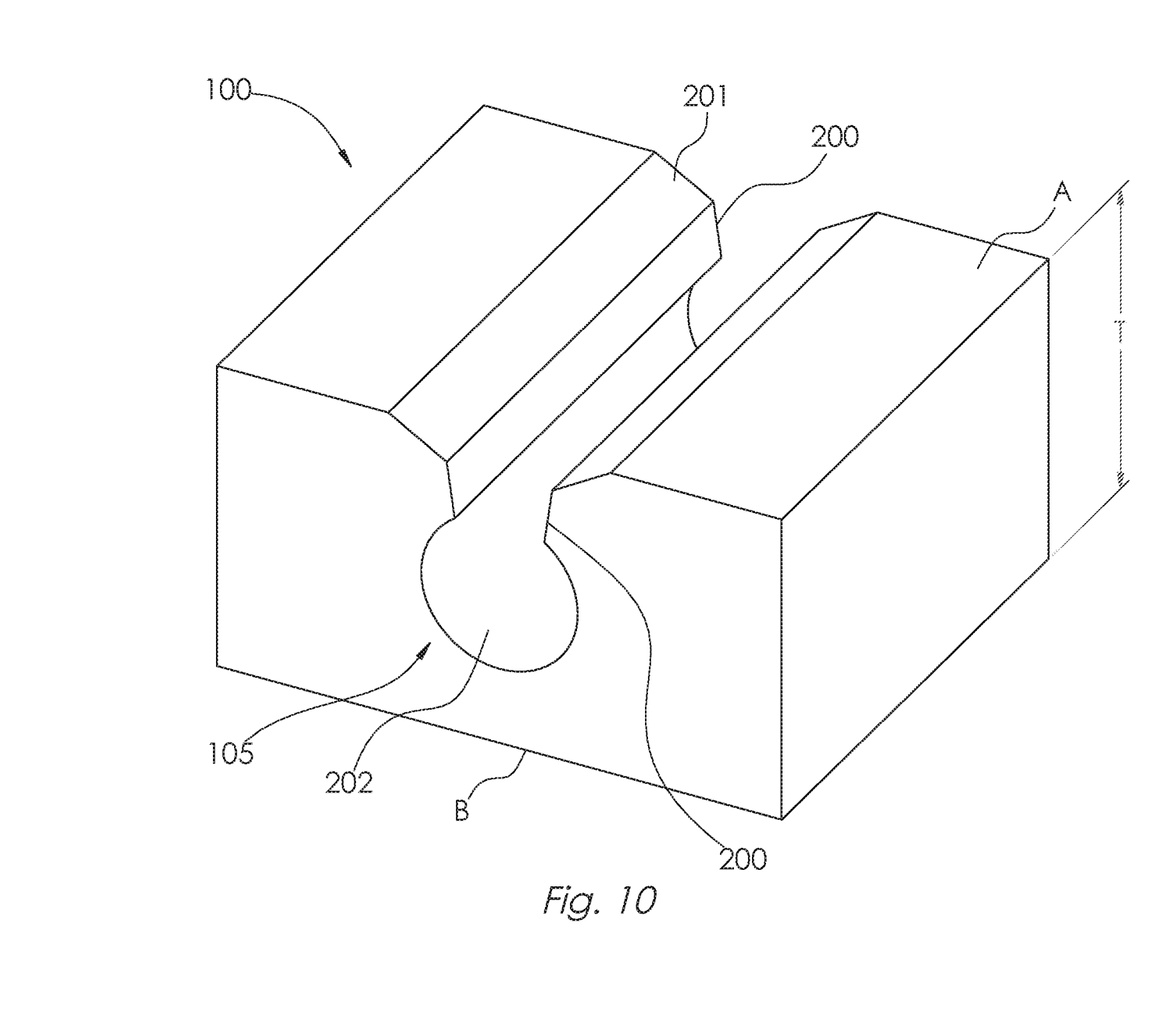
FIG. 10 depicts a perspective view of an embodiment of the inventive retention feature of the invention.

Referring now to FIG. 10, a perspective view of the light retaining cavity is shown in a traction pad of thickness T. In this figure, the object to be retained 104, which may be a cylindrical object, is not depicted so as to clearly show the retaining cavity 202, which in the exemplary embodiment shown is cylindrical but make take any cross sectional shape. The retaining apparatus comprises opposing bevels for visibility 201, opposing tapered window retention surfaces 200, and retaining cavity 202 which features retaining apparatus 105 for retaining an object to be retained 104 in retaining cavity 202.

Figure 11:
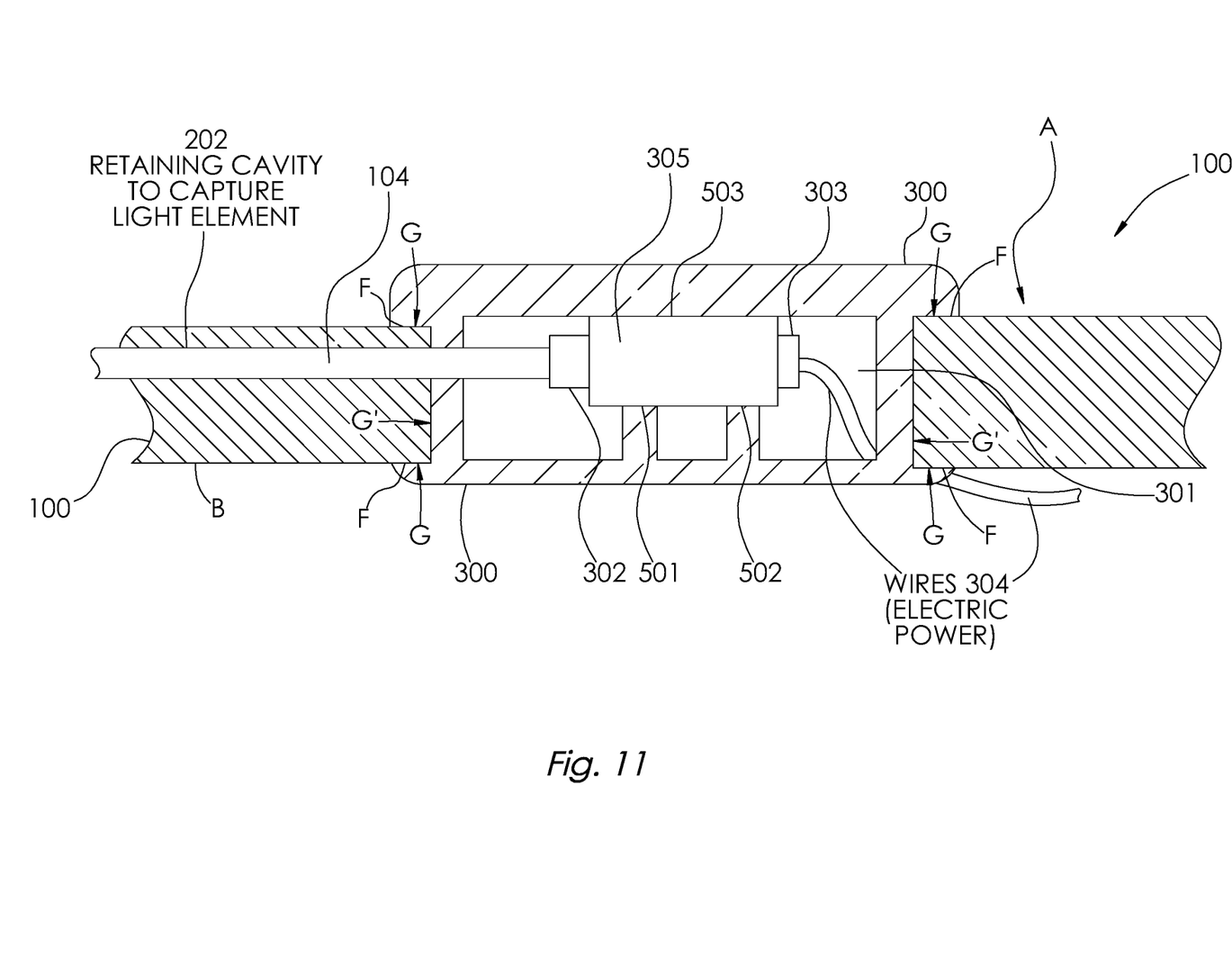
FIG. 11 depicts a cross section view of an embodiment of the inventive, showing the retention of a light source housing disposed in a base structure or traction pad cavity, and showing connectorization for removably attaching a light element or electrical wiring, or both, to the light source such that the light source may be quickly disconnected from a light element or electric wiring, or both, and removed and replaced, without the need for special tooling, or any tooling at all.

Referring now to FIG. 11, a cross section view of an embodiment of the inventive, showing the retention of a light source housing of the invention 300 disposed in a pad or base structure 100 void 301, and showing connectorization for removably attaching a light element or electrical wiring, or both, to light source 305 such that light source 305 may be quickly disconnected from a lighting element 104 or electric wiring 304, or both, and removed and replaced, without the need for special tooling, or any tooling at all. Light source 305 may be in electrical communication with a source of electric power via wiring 304. Light source 305, which may be an electrical power convertor for providing electric power to a strip of light emitting devices such as LEDs that comprise lighting element 104, or which may be a source of light energy such as an LED or laser that may illuminate lighting element 104 thereby dispersing light energy along the length of lighting element 104, may be captured within housing 300 by any means know in the mechanical arts, but may be a non-chemical bonding or threaded fastener means, such as a press fit between features of housing 300 such as between points 501, 502 and 500. Thus it is preferable, but not necessary, that light source 305 be removable from housing 300 without the use of any tools. Lighting element 104 may be captured in a compression fit in retaining cavity 202. Light source 305 may be captured in housing 300 that is held in place in a base structure 100 by the compression of the base structure material against two opposing surfaces of housing 300 such as, for example, points F, G or G', creating a compression fit caused by the opposing forces G or G' created by the compressible base structure 100 material seeking to expand against the two opposing surfaces of the housing 300 at points F. In embodiments, such as in the case in which base structure 100 comprises a compressible material such as, for example, EVA or PE foam, these opposing forces G or G' may create retention forces due to the compressible nature of the material comprising base structure 100 which capture housing 300 in base structure cavity 301. In this embodiment, light source 305 may be disconnected from electric wiring 304 at electrical connector 303, or an optical cable or lighting element 104 at optical connector 302, or both, so that light source 305 may easily be replaced without the need to strip and connect electrical wiring (such as by soldering or crimping connectors onto the wiring) and without the need for any tools. Thus, replacement of light source 305 is greatly simplified.

Referring still to FIG. 11, any of the embodiments of the device may comprise a light source 305 which may be an electrical power convertor for providing electric power to a strip of light emitting devices such as LEDs that comprise lighting element 104, or which may be a source of light energy such as an LED or laser that is coupled to a lighting element for dispersing light energy along lighting element 104, which may include but not be limited an optical fiber, an LED lights strip, a luminescent material, a light pipe, or any type of conduit that comprises a light dispersing material such as a phosphorous or other light-dispersing material. In embodiments, lighting element 104 may be flexible so as to conform to curves in retaining cavity 202. Base structure upper surface A and lower surface B are shown for reference.

Embodiments of the invention may comprise at least one, or all, or any of the described features, in any combination.

What is claimed is:

1. A connectorized lighting system for a base structure, comprising:
   a base structure having an upper surface and a lower surface; and
   a retaining cavity disposed in and running along and below one of said upper or lower surface, said retaining cavity comprising an opening into said surface that runs along said retaining cavity for allowing the insertion of a lighting element in said retaining cavity;
   a lighting element disposed in said retaining cavity, said lighting element in optical communication with a light source;
   wherein said light source is removably attached to a housing;
   wherein said housing is removably retained in a void in said base structure by retention forces created by the compression of base structure material between two opposing surfaces of said housing.

2. The connectorized lighting system of claim 1, further comprising a detachable optical connection between said lighting element and said light source.

3. The connectorized lighting system of claim 1, further comprising a detachable electrical connection between said light source and a source of electric power.

4. The connectorized lighting system of claim 1, wherein said retaining cavity opening is further defined as comprising a pair of opposing bevel surfaces where said retaining cavity opening opens into said base structure surface, and wherein said retaining cavity opening further comprises a pair of opposing window retention surfaces disposed between said retaining cavity and said pair of opposing bevel surfaces.

5. The connectorized lighting system of claim 1, in which said base structure is further defined as comprising a compressible material.

6. The connectorized lighting system of claim 5, in which said compressible material is further defined as being either EVA or PE foam.

7. The connectorized lighting system of claim 1, in which said base structure is further defined comprising a plurality of layers of sheet material.

8. The connectorized lighting system of claim 1, wherein said retaining cavity is comprised of a circular cross section.

9. The connectorized lighting system of claim 4, further comprising a window disposed and retained between said opposing window retention surfaces.

10. The connectorized lighting system of claim 9, wherein said window comprises transparent material.

11. The connectorized lighting system of claim 1, wherein said lighting element is further defined as an optical fiber.

12. The connectorized lighting system of claim 1, wherein said lighting element is further defined as comprising an LED strip light element.

13. The connectorized lighting system of claim 1, wherein said lighting element is further defined as comprising a phosphorescent material.

14. A connectorized lighting system for a base structure, comprising:
   a base structure having an upper surface and a lower surface; and said base structure comprising a plurality of stacked planar sheets of material, wherein each sheet has an upper planar surface and a lower planar surface, and further comprising a top sheet having a lower planar surface that is laminated to an upper planar surface of the next planar sheet below said top sheet in said stack of sheets;

a lighting element disposed between said top sheet and said next planar sheet below said top sheet in said stack of sheets oriented such that a portion of the light emitted by said lighting element passes through said top sheet;

wherein said lighting element is in optical communication with a light source;

wherein said light source is removably attached to a housing;

wherein said housing is removably retained in a void in said base structure by retention forces created by the compression of base structure material between two opposing surfaces of said housing.

15. The connectorized lighting system of claim 14, further comprising a detachable optical connection between said lighting element and said light source.

16. The connectorized lighting system of claim 14, further comprising a detachable electrical connection between said light source and a source of electric power.

17. The connectorized lighting system of claim 14, in which said base structure is further defined as comprising a compressible material.

18. The connectorized lighting system of claim 17, in which said compressible material is further defined as being either EVA or PE foam.

19. The connectorized lighting system of claim 14, wherein said lighting element is further defined as an optical fiber.

20. The connectorized lighting system of claim 14, wherein said lighting element is further defined as comprising an LED strip light element.

21. The connectorized lighting system of claim 14, wherein said lighting element is further defined as comprising a phosphorescent material.

* * * * *